(12) United States Patent
Biswurm et al.

(10) Patent No.: US 7,164,296 B2
(45) Date of Patent: Jan. 16, 2007

(54) RUNT-PULSE-ELIMINATING MULTIPLEXER CIRCUIT

(75) Inventors: Uwe Biswurm, Frankfurt (DE); Bernd Neumann, Muellrose (DE)

(73) Assignee: Micrel, Inc., San Jose, CA (US)

( * ) Notice: Subject to any disclaimer, the term of this patent is extended or adjusted under 35 U.S.C. 154(b) by 186 days.

(21) Appl. No.: 10/946,956

(22) Filed: Sep. 21, 2004

(65) Prior Publication Data

US 2006/0061407 A1 Mar. 23, 2006

(51) Int. Cl.
*G06F 1/08* (2006.01)

(52) U.S. Cl. .......................... 327/99; 327/298
(58) Field of Classification Search .................. None
See application file for complete search history.

(56) References Cited

U.S. PATENT DOCUMENTS

| | | | | |
|---|---|---|---|---|
| 4,855,616 A | * | 8/1989 | Wang et al. ................. 327/145 |
| 5,155,380 A | * | 10/1992 | Hwang et al. ................. 327/99 |
| 5,274,678 A | * | 12/1993 | Ferolito et al. ............. 375/357 |
| 6,593,780 B1 | * | 7/2003 | Lammers ...................... 327/99 |
| 6,809,556 B1 | * | 10/2004 | Bronfer et al. ............... 327/99 |
| 6,831,959 B1 | * | 12/2004 | Manchester ................. 375/354 |

* cited by examiner

*Primary Examiner*—Tuan T. Lam
(74) *Attorney, Agent, or Firm*—Patent Law Group LLP; Carmen C. Cook (57) ABSTRACT

A multiplexer circuit for selecting one of first and second input signals based on a first input select signal includes a multiplexer, a control circuit and an enable buffer. The multiplexer selects one of the first and second input signals based on a second input select signal generated by the control circuit and provides a second output signal. The control circuit receives the second output signal and the first input select signal to generate the second input select signal and an enable signal where the signals have transitions synchronized to the transitions of the second output signal. The enable buffer operates to allow or disallow the second output signal to be passed as the output signal of the multiplexer circuit in response to the enable signal. The multiplexer circuit operates to eliminate runt pulse generation during the switching over of the input signals to provide an error-free output data stream.

17 Claims, 5 Drawing Sheets

RUNT-PULSE-ELIMINATING MULTIPLEXER CIRCUIT

FIELD OF THE INVENTION

The invention relates to a multiplexer circuit and, in particular, to a multiplexer circuit that eliminates the generation of runt pulses when the multiplexer circuit is used to select between two asynchronous periodic signals.

DESCRIPTION OF THE RELATED ART

In some system designs, the requirement for build-in redundancy calls for the provision of two clock signals so that a back-up clock signal is available in the event that the primary or the active clock signal fails. Typically, a multiplexer is used to select one of two clock signals using an asynchronous clock-select signal. When the asynchronous clock-select signal is toggled to switch the selection from one clock signal to another clock signal, the mutliplexer may generate undesired clock signals or runt pulses at the output of the multiplexer. Runt pulses may be generated when the two clock signals are asynchronous or are synchronous but with a non-zero phase difference. The runt pulses may pass through the system and alter the system performance for which the system is not designed for. Thus, generation of runt pulses during clock signal switch-overs is undesirable.

Figure 1:
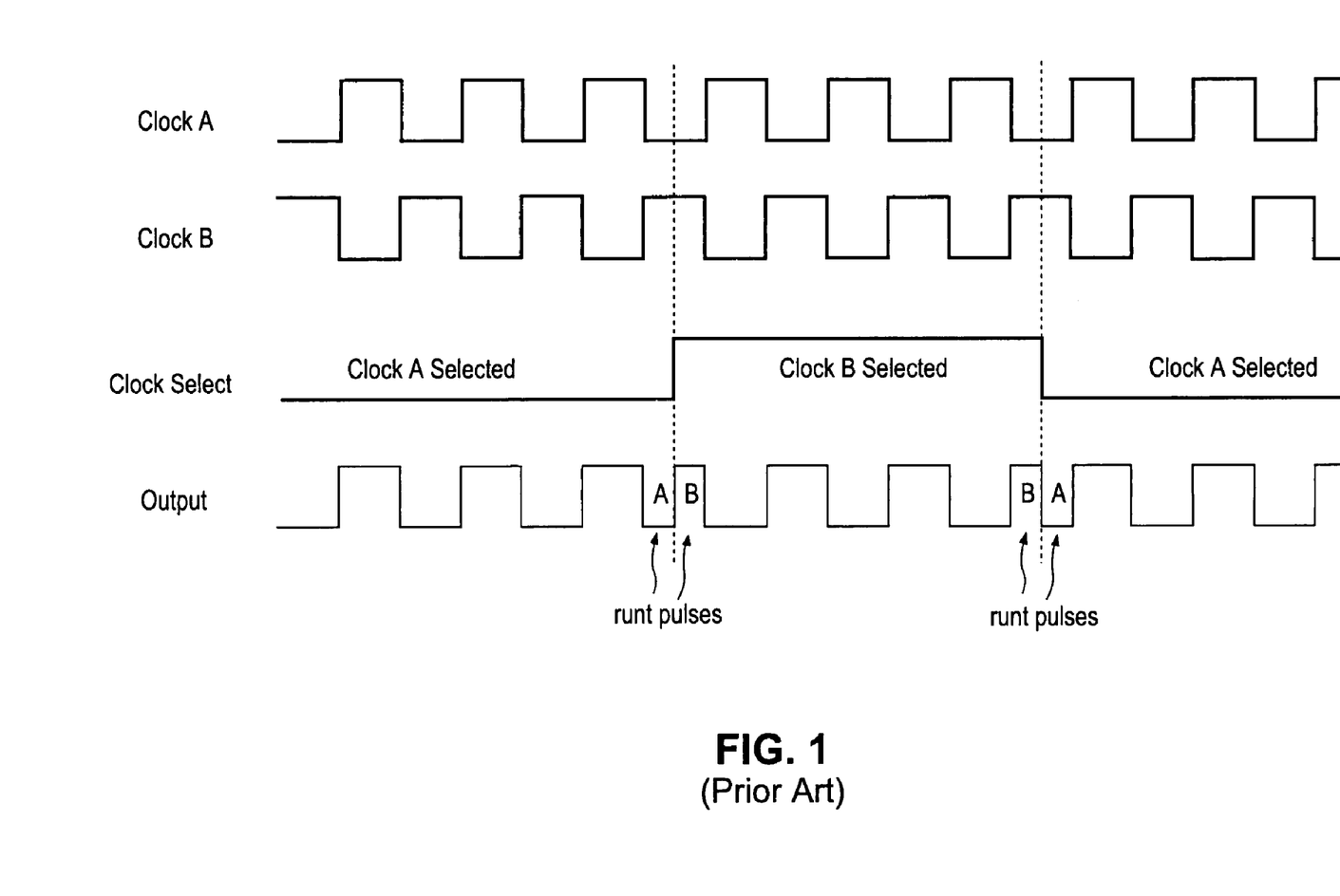
FIG. 1 includes signal waveforms illustrating the generation of runt pulses during input switch-over operations of a conventional multiplexer circuit.

FIG. 1 includes signal waveforms illustrating the generation of runt pulses during input switch-over operations of a conventional multiplexer circuit. As shown in FIG. 1, a conventional multiplexer receiving clock A and clock B as input signals will switch between the two clock signals in accordance with the clock-select signal. In the present illustration, clock A and clock B have equal frequencies but are 180° out of phase and in general the two clock signals can be synchronous clock signals having any phase relations or asynchronous clock signals. Also, in the present illustration, the clock-select signal selects clock A when it has a logical low value and selects clock B when it has a logical high value. When the clock-select signal switches asynchronously, that is, not in synchronous with the transitions of clocks A and B, runt pulses are generated at the output of the multiplexer, as illustrated by the bottom waveform. For instance, when the clock-select signal switches from a logical low value to a logical high value as shown in FIG. 1, the output signal of the multiplexer passes half of clock A and then switches to pass half of clock B, resulting in the formation of a runt pulse.

In many applications, runt pulses in the clock streams are not allowed. Thus, there is a need to prevent or to eliminate runt pulses at the output of a multiplexer when the multiplexer switches over from one input signal to another input signal.

SUMMARY OF THE INVENTION

According to one embodiment of the present invention, a multiplexer circuit for selecting one of a first input signal and a second input signal as a first output signal based on a first input select signal includes a multiplexer, a control circuit and an enable buffer. The multiplexer has a first input terminal for receiving the first input signal, a second input terminal for receiving the second input signal, a select input terminal receiving a second input select signal. The multiplexer provides a second output signal being the first input signal when the second input select signal has a first logical state and the second input signal when the second input select signal has a second, opposite logical state. The control circuit is coupled to receive the second output signal and the first input select signal. The control circuit generates the second input select signal and an enable signal whereby the transitions of the second input select signal and the transitions of the enable signal are synchronized to a first transition of the second output signal. Finally, the enable buffer is coupled to receive the second output signal and the enable signal where the enable buffer provides the second output signal as the first output signal when the enable signal is asserted and the enable buffer holding the first output signal at a first logical state when the enable signal is deasserted.

In operation, in response to a transition on the first input select signal, the enable signal is deasserted at a next transition of the second output signal. In response to the enable signal being deasserted, the second input select signal transitions to the same logical state as the first input select signal, thereby causing the second output signal to switch from the currently selected input signal to the to-be-selected input signal. Finally, the enable signal is asserted on a next first transition of the second output signal subsequent to the switching of second output signal to the to-be-selected input signal. Furthermore, the control circuit includes an edge detector, a reset-set-flip-flop, a synchronizer circuit and a latch.

In one embodiment, the first transitions of the second output signal are falling edges of the second output signal and the first logical state of the first output signal comprises a logical low state. In another embodiment, the first transitions of the second output signal are rising edges of the second output signal and the first logical state of the first output signal comprises a logical high state.

In yet another embodiment, the first input signal and the second input signal are periodic signals that are either asynchronous or synchronous with any phase relation. In one embodiment, the first input signal and the second input signal are clock signals that are either asynchronous or synchronous with any phase relation and the first input select signal is an asynchronous clock select signal for selecting one of the clock signals.

According to another aspect of the present invention, a method for selecting one of a first input signal and a second input signal as a first output signal based on a first input select signal includes: generating a second output signal being a selected one of the first and second input signals based on a second input select signal; detecting a transition on the first input select signal; in response to a transition being detected on the first input select signal, disabling the first output signal at a next first transition of the second output signal; in response to the first output signal being disable, generating the second input select signal where the second input select signal has the same logical state as the first input select signal and has transitions synchronized to the next first transition of the second output signal; in response to transitions on the second input select signal, switching the second output signal from the currently selected input signal to the to-be-selected input signal; and subsequent to the switching of the second output signal, enabling the first output signal at a next first transition of the second output signal where the second output signal is passed as the first output signal. Furthermore, the step of generating the second input select signal includes receiving the first input select signal; generating a pulse in response to a transition on the first input select signal; providing the pulse as the set input signal of a reset-set-flip-flop, providing the enable signal as the reset input signal of the reset-set-flip-flop; generating an output signal at the reset-set-flip-flop having a first logical state when the set input signal is asserted and a second, opposite logical state when the reset input signal is asserted; providing the output signal of the reset-set-flip-flop as a data input signal of a synchronizer circuit, providing the second output signal as a clock input signal of the synchronizer circuit; generating the enable signal having a logical value corresponding to the data input signal where the transitions of the enable signal are synchronized to the first transitions of the second output signal; providing the first input select signal as a data input signal of a latch, and providing the enable signal as a clock input signal of the latch; and generating the second input select signal having a logical value corresponding to the first input select signal where the transitions of the second input select signal are synchronized to the first transitions of the second output signal.

The present invention is better understood upon consideration of the detailed description below and the accompanying drawings.

DETAILED DESCRIPTION OF THE PREFERRED EMBODIMENTS

In accordance with the principles of the present invention, a multiplexer circuit for selecting one of two periodic input signals based on an asynchronous input select signal includes a control circuit to internally synchronize the input select switching operation and an enable buffer to control the output signal of the multiplexer circuit. When applied to select one of two asynchronous periodic input signals or one of two synchronous periodic input signals with a non-zero phase relation, the multiplexer circuit of the present invention operates to eliminate the generation of runt pulses at the output entirely to ensure error-free switching of the periodic input signals.

More specifically, the control circuit generates a signal to cause a stop in the output signal pulse stream during the critical process of switching from one input signal to the other input signal. The control circuit operates to block all pulses, including runt pulses, for a limited time during the switch-over operation. The enable buffer is activated synchronous with the selected input signal so that a runt-pulse-free input signal switching operation is realized. The multiplexer circuit of the present invention has particular application in selecting one of two asynchronous clock signals or one of two synchronous clock signals with non-zero phase relation using an asynchronous clock select signal. The synchronizing mechanism operating in the control circuit eliminates possible runt pulses in the output clock stream during the asynchronous switching of the two clock signals.

Figure 2:
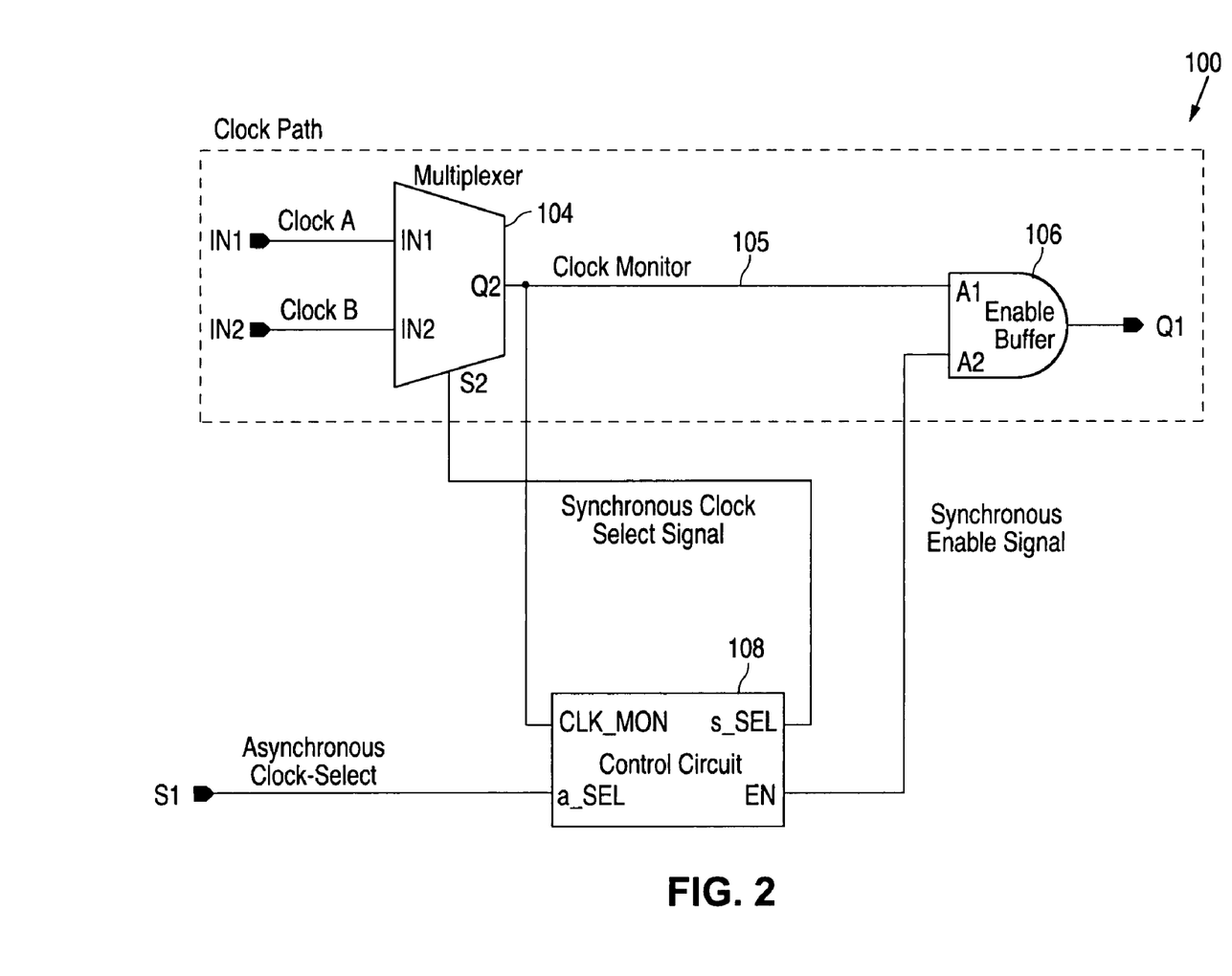
FIG. 2 is a schematic diagram of a multiplexer circuit according to one embodiment of the present invention.

FIG. 2 is a schematic diagram of a multiplexer circuit according to one embodiment of the present invention. Referring to FIG. 2, a multiplexer circuit 100 includes a multiplexer 104, an enable buffer 106 and a control circuit 108. Multiplexer circuit 100 receives first and second input signals on input terminals In1 and In2 and an input select signal on a select input terminal S1. Multiplexer circuit 100 provides an output signal on an output terminal Q1 where the output signal is selected from the first or the second input signal based on the state of the input select signal. The multiplexer circuit of the present invention has particular application in selecting one of two input signals that are periodic signals, such as clock signals. Furthermore, the input select signal is typically an asynchronous select signal and the rising and falling edges of the input select signal therefore do not necessarily coincide with the transitions of either of the first or the second input signal.

More specifically, the input signals to the multiplexer circuit of the present invention can be periodic signals that are either asynchronous or synchronous. However, the runt-pulse-eliminating capability of the multiplexer circuit is exploited only when the input signals are asynchronous or synchronous with a non-zero phase relation. In the present description, two periodic signals are asynchronous when the two signals have different frequencies. Two asynchronous periodic signals therefore will always have a non-constant phase relationship. On the other hand, two periodic signals are synchronous when the two signals have the same frequency. Two synchronous periodic signals have a constant or fixed phase relation that is greater than or equal to 0° and less than 360° (i.e., 0°<=phase<360°). For example, the phase relationship can be 0 degree, 90 degrees, 100 degrees, 180 degrees or 270 degrees.

When two periodic input signals are synchronous and have a 0° phase relation, switching of the two periodic input signals using any multiplexers will not generate runt pulses. However, when the two periodic input signals are asynchronous (have different frequencies) or are synchronous (have same frequencies) with a non-zero phase relation, switching between the two periodic input signals using conventional multiplexers based an asynchronous input select signal may cause runt pulse to be generated. This is because the input select signal, which is not synchronized to the transitions of the input signals, can switch the input signals when the input signals are at different logical states, thereby generating runt pulses. The multiplexer circuit of the present invention is thus most advantageously applied to eliminate runt pulse generation when the two input signals are periodic input signals that are either asynchronous (have different frequencies) or synchronous (have same frequencies) with a non-zero phase relation. However, the multiplexer circuit of the present invention can also operate on two synchronous periodic input signals with a 0° phase relationship. The multiplexer circuit of the present invention can be used effectively to select between the two synchronous periodic input signals with a 0° phase relation even though the runt-pulse eliminating advantage of the multiplexer circuit is not being exploited.

In the present illustration, the two input signals are two synchronous clock signals, clock A and clock B, with an 180° phase relationship. The input select signal is an asynchronous clock select signal. The output signal is therefore a clock stream including clock pulses from clock A or from clock B, as selected by the clock select signal. It is understood that the multiplexer circuit of the present invention can be applied to work with any two input signals that are generally periodic in nature, including but not limited to clock signals. References to clock signals as the input signals and a clock select signal as the input select signal for the mutliplexer circuit of FIG. 2 are illustrative only and are not intended to be limiting.

In multiplexer circuit 100, multiplexer 104 is a two-input multiplexer and can be implemented using any conventional multiplexer circuit topology. Multiplexer 104 receives Clock A and Clock B as the respective first and second input signals and receive an internally generated synchronous clock select signal as the input select signal on a select input terminal S2. Multiplexer 104 provides an output signal denoted as a "clock monitor" signal on an output terminal Q2 (node 105). The clock monitor signal is either the first input signal (clock A) or the second input signal (clock B) as selected by the synchronous clock select signal on select input terminal S2.

Control circuit 108 receives the clock monitor signal on node 105 and also the asynchronous clock select signal on terminal S1. Control circuit 108 generates the synchronous clock select signal which is provided to the select input terminal S2 of multiplexer 104. Control circuit 108 also provides a synchronous enable signal to enable buffer 106. Synchronous clock select signal is based on the asynchronous clock select signal but synchronized to the synchronous enable signal so that the synchronous clock select signal switches states only when the enable signal is deasserted (disabled). The synchronous clock select signal is used advantageously to ensure that the switching over of the input signals at multiplexer 104 occurs only when enable buffer 106 is disabled so that no error pulses can pass through to the output signal, as will be explained in more detail below.

Enable buffer 106 receives the clock monitor signal on node 105 and the synchronous enable signal from control circuit 108. The synchronous enable signal operates to enable or disable enable buffer 106 to either allow or disallow the clock monitor signal to pass through to output terminal Q1 as the output signal for multiplexer circuit 100. When enable buffer 106 is enabled, the output signal of multiplexer circuit 100 on terminal Q1 is either the first input signal (clock A) or the second input signal (clock B). When enable buffer 106 is disabled, the output signal of multiplexer circuit 100 is held to a predetermined logical state (a high or a low logical state). As will be explained in more detail below, enable buffer 106 is disabled during the switching over period of the input signal selection to prevent error pulses or runt pulses to pass through to the output signal pulse stream. In the present embodiment, enable buffer 106 is implemented as an AND logic gate. One of ordinary skill in the art would appreciate that other logic gates or other combinations of logic gate can be used to implement the enable buffer to provide the desired enable and disable functions based on the synchronous enable signal.

Figure 3:
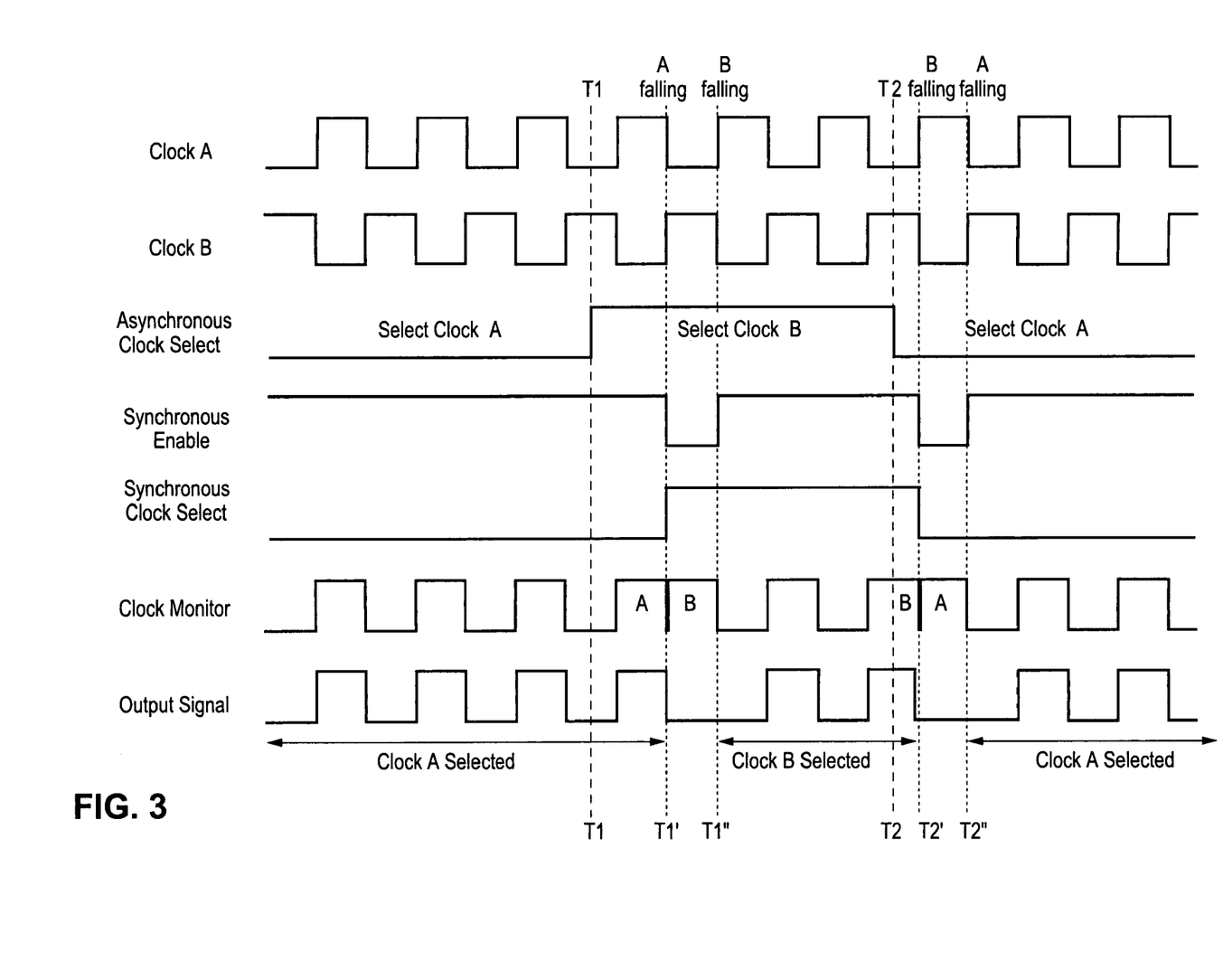
FIG. 3 includes signal waveforms illustrating the operation of the multiplexer circuit of FIG. 2 according to one embodiment of the present invention.

The operation of multiplexer circuit 100 will now be described in conjunction with the signal waveforms in FIG. 3. FIG. 3 includes signal waveforms illustrating the operation of the multiplexer circuit of FIG. 2 according to one embodiment of the present invention. Referring to FIG. 3, clock signals A and B are two synchronous clock signals that are 180° out of phase. An asynchronous clock select signal is used to select the first input signal (clock A) when it is at a logical low level and select the second input signal (clock B) when it is at a logical high level. It is assumed that multiplexer circuit 100 is in steady state where the clock select signal is at a logical low value and thus clock A is selected and the output signal is a clock stream containing clock pulses from clock A. The synchronous enable signal is normally at a logical high (asserted) to allow enable buffer 106 to pass the selected input signal (clock A) through to the output terminal). The synchronous clock select signal has a value corresponding to the asynchronous clock select signal but is synchronized to the transitions of the input signals. In the initial condition shown in FIG. 3, synchronous clock select signal is at steady state and has a logical low value to select clock A.

When a transition occurs on the asynchronous clock select signal to select another input signal, control circuit 108 operates to buffer the select signal transition and the output signal does not switch over immediately in response to the transition on the asynchronous clock select signal. Referring to FIG. 3, a low-to-high transition on the asynchronous clock select signal occurs at a time T1 to indicate that the second input signal (clock B) should now be selected. Control circuit 108 monitors the clock pulses on the output of multiplexer 104 through the clock monitor signal. In the present embodiment, control circuit 108 operates to synchronize the asynchronous clock select signal to the next falling edge (high-to-low transition) of the currently selected input signal. In operation, control circuit 108 generates the synchronous clock select signal and the synchronous enable signal in response a transition on the asynchronous clock select signal but the transitions of the two synchronous signals are synchronized to the falling edge of the currently selected input signal.

Thus, in response to the low-to-high transition on the asynchronous clock select signal, control circuit 108 waits for the next falling edge of clock A which is the currently selected input signal. At the next failing edge of clock A, the synchronous enable signal is deasserted (transition to logical low) to disable enable buffer 106. The output signal of multiplexer circuit 100 is thus disabled and is held at a logical low state in the present embodiment until the switching over of the input signals is completed.

At the same time that the synchronous enable signal is deasserted, the synchronous clock select signal transitions from a logical low state to a logical high state to select clock B in accordance with the asynchronous clock select signal. The synchronous clock select signal drives multiplexer 104 and causes the clock monitor signal to switch from clock A to clock B, as shown in FIG. 3. Note that because clock A and clock B are 180° out of phase, the falling edge of clock A coincides with the rising edge of clock B. In FIG. 3, a small gap between the last clock pulse of clock A and the first clock pulse of clock B is shown in the clock monitor signal for illustrative purpose only. During the time that multiplexer 104 switches from the first input signal (clock A) to the second input signal (clock B), enable buffer 106 is disabled and thus no pulses are passed to the output signal.

When the switch over operation of the input signals is completed, the output signal of multiplexer circuit 100 can be enabled to begin passing the selected input signal. In multiplexer circuit 100, the output signal is enabled synchronous with the selected input signal to again ensure an error-free output pulses stream. Thus, at the next falling edge (high-to-low transition) of the selected clock signal (clock B), the synchronous enable signal is asserted (logical high) to enable enable buffer 106. Clock pulses from clock B that are present on node 105 (the clock monitor signal) thus pass through enable buffer 108 to form the output signal.

FIG. 3 further illustrates a high-to-low transition on the asynchronous clock select signal at time T2 to select clock A. Multiplexer circuit 100 operates in the same manner to provide an error-free switch-over in the output clock stream from clock B to clock A, as shown in FIG. 3. In operation, the synchronous enable signal is deasserted at the next falling edge of clock B (the currently selected input signal) following the high-to-low transition on the asynchronous clock select signal. The output signal is thus held at a logical low value. The synchronous clock select signal transitions synchronously with the deassertion of the enable signal to select clock A, and clock pulses from clock A are passed to node 105 (the clock monitor signal). Then, on the next falling edge of clock A (the selected input signal), the synchronous enable signal is asserted and the output signal is enabled to allow clock A to pass through to output terminal Q1. In this manner, multiplexer circuit 100 generates a runt pulse free clock stream as the output signal switches between two synchronous input clock signals with a non-zero phase relation.

In operation, the multiplexer circuit of the present invention disables the output signal during the switch-over period of the input signals. For each transition of the asynchronous clock select signal, the time period between the next falling edge of the currently selected input signal (time T1' or T2') and the next falling edge of the to-be-selected input signal (time T1" or T2") constitutes the switch-over period where the output signal is disabled. As shown in FIG. 3, the switch-over periods are free of runt pulses and the multiplexer circuit of the present invention achieves error-free switch-overs during selection and switching of the input signals.

In the above described embodiment, the control circuit is triggered off the falling edges (high-to-low transitions) of the input signals. Thus, the output signal of the multiplexer circuit is held low during the switch-over period. In other embodiments, the control circuit can be implemented as being triggered off the rising edges (low-to-high transitions) of the input signals. In that case, the output signal of the multiplexer circuit is held high during the switch-over period.

The asynchronous clock select signal can have a first logical state selecting one of the first and second input signals and a second logical state selecting the other one of the first and second input signals. The specific logical state associated with selecting the first or the second input signal is not critical to the practice of the present invention.

Finally, the enable buffer can be implemented to respond to a logical high value for enabling the output signal or a logical low value for enabling the output signal. The specific logical state for enabling the enable buffer is not critical to the practice of the present invention.

Figure 4:
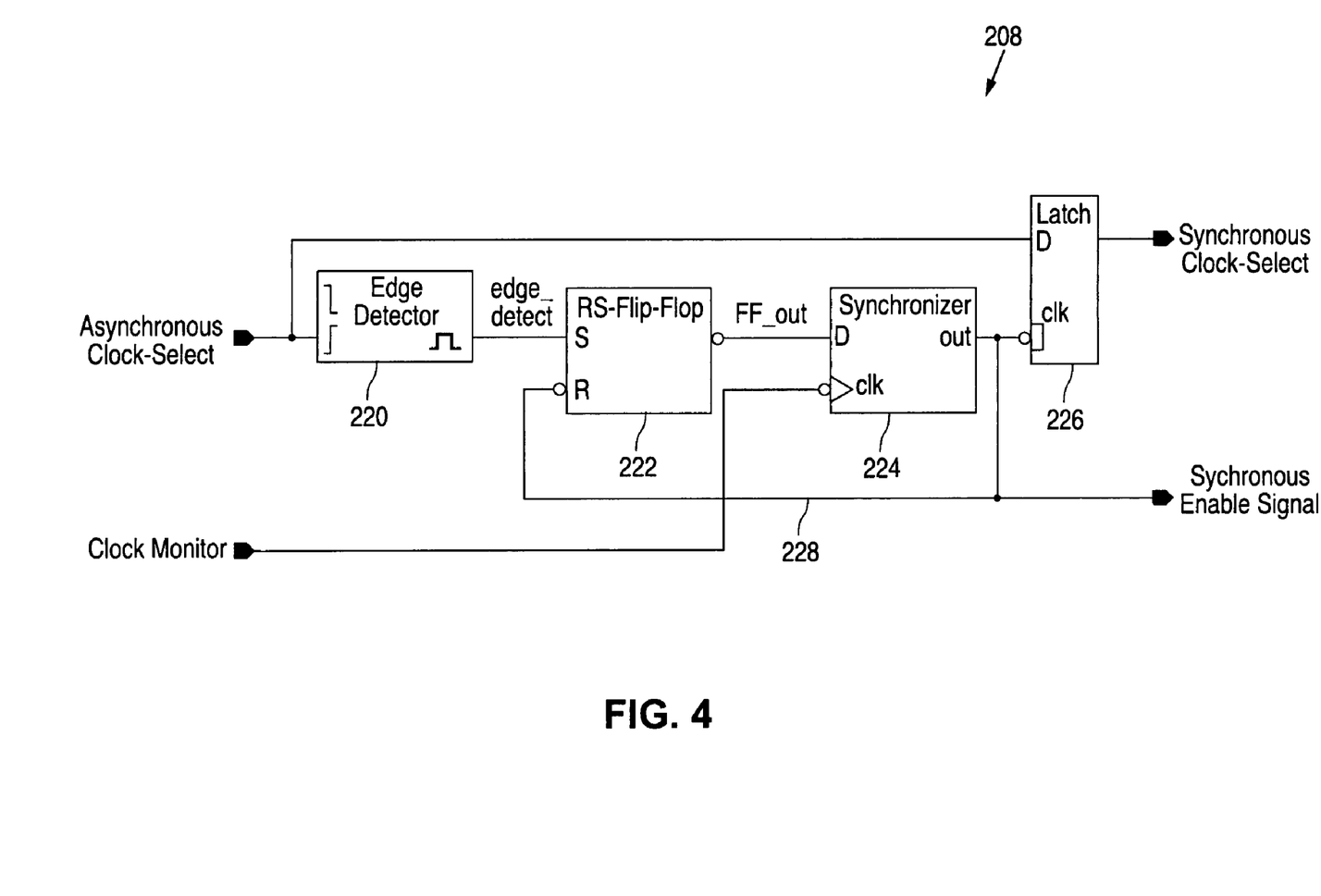
FIG. 4 is a schematic diagram of a control circuit which can be incorporated in the multiplexer circuit of FIG. 2 according to one embodiment of the present invention.

FIG. 4 is a schematic diagram of a control circuit which can be incorporated in the multiplexer circuit of FIG. 2 according to one embodiment of the present invention. FIG. 4 illustrates one embodiment of a control circuit for generating the synchronous clock select signal and the synchronous enable signal. One of ordinary skill in the art would appreciate that other combination of logic gates can be used to implement the desired functionality of the control circuit in the multiplexer circuit of the present invention. The control circuit of FIG. 4 is illustrative only.

Referring to FIG. 4, control circuit 208 includes an edge detector 220 for receiving the asynchronous clock select signal. Edge detector 220 operates to detect any transitions (or edges) on the asynchronous clock select signal and provide a single pulse as the "edge_detect" output signal. The edge_detect signal is coupled to the set (S) input terminal of a reset-set-Flip-Flop (RS-FF) 222. The reset (R) input terminal of the RS-FF receives a feedback signal from the control circuit. Specifically, the synchronous enable signal is fed back to the reset (R) input terminal of RS-FF 222. In the present embodiment, the inverted output signal of RS-FF 222 is taken as the "FF_out" output signal. Thus, when the set (S) input is asserted by a logical high signal, the FF_out signal will transition to a logical low. When the reset (R) input is asserted by a logical low signal, the FF_out signal will transition to a logical high.

The FF_out signal from RS-FF 222 is coupled to a synchronizer 224 as the data input signal. The clock monitor signal is coupled to synchronizer 224 as the clock input signal. Synchronizer 224 operates to synchronize the transitions of the data input signal to the falling edges of the clock input signal. Thus, the data output signal from synchronizer 224 has logical values corresponding to the data input signal (FF_out) but the transitions of the data output signal are synchronized to the falling edges of the pulses of the clock input signal (the clock monitor signal). As described above, the clock monitor signal comprises signal pulses of the selected input signal. Thus, the data output signal of synchronizer 224 is synchronized to the falling edges of the selected input signal. In other words, synchronizer 224 is triggered by the falling edges of the selected input signal to pass the values of the data input signal (FF_out) to the output terminal. The data output signal of synchronizer 224 is the synchronous enable signal which is used to drive the enable buffer and is also fed back to the reset (R) terminal of RS-FF 222. On the falling edge of the synchronous enable signal, RS-FF 222 is reset and the FF_out signal transitions to a logical high state.

Synchronizer 224 can be implemented using a single D-Flip-flop or it can be implemented using a chain of D-Flip-Flops to improve the stability to prevent metastable behavior due to the asynchronous character of the input signals and the input select signals. Also, other more complex circuit topology can also be used to provide the required functionality of synchronizer 224.

Finally, control circuit 208 includes a latch 226 receiving the asynchronous clock select signal as the data input and the synchronous enable signal from synchronizer 224 as the clock input. Latch 226 provides the synchronous clock select signal as the output signal. Thus, the synchronous clock select signal has logical values corresponding to the asynchronous clock select signal but the transitions of the synchronous clock select signal are synchronized to the falling edge of the synchronous enable signal, where the enable signal is in turn synchronized to the falling edge of the selected input signal. In other words, latch 226 is put in a transparent state on the falling edge of the clock input signal (synchronous enable signal) and allows the asynchronous clock select signal to pass through. On the rising edge of the synchronous enable signal, latch 226 is put back into a non-transparent state to prevent transitions on the asynchronous clock select signal to pass through until the latch is made transparent again.

Figure 5:
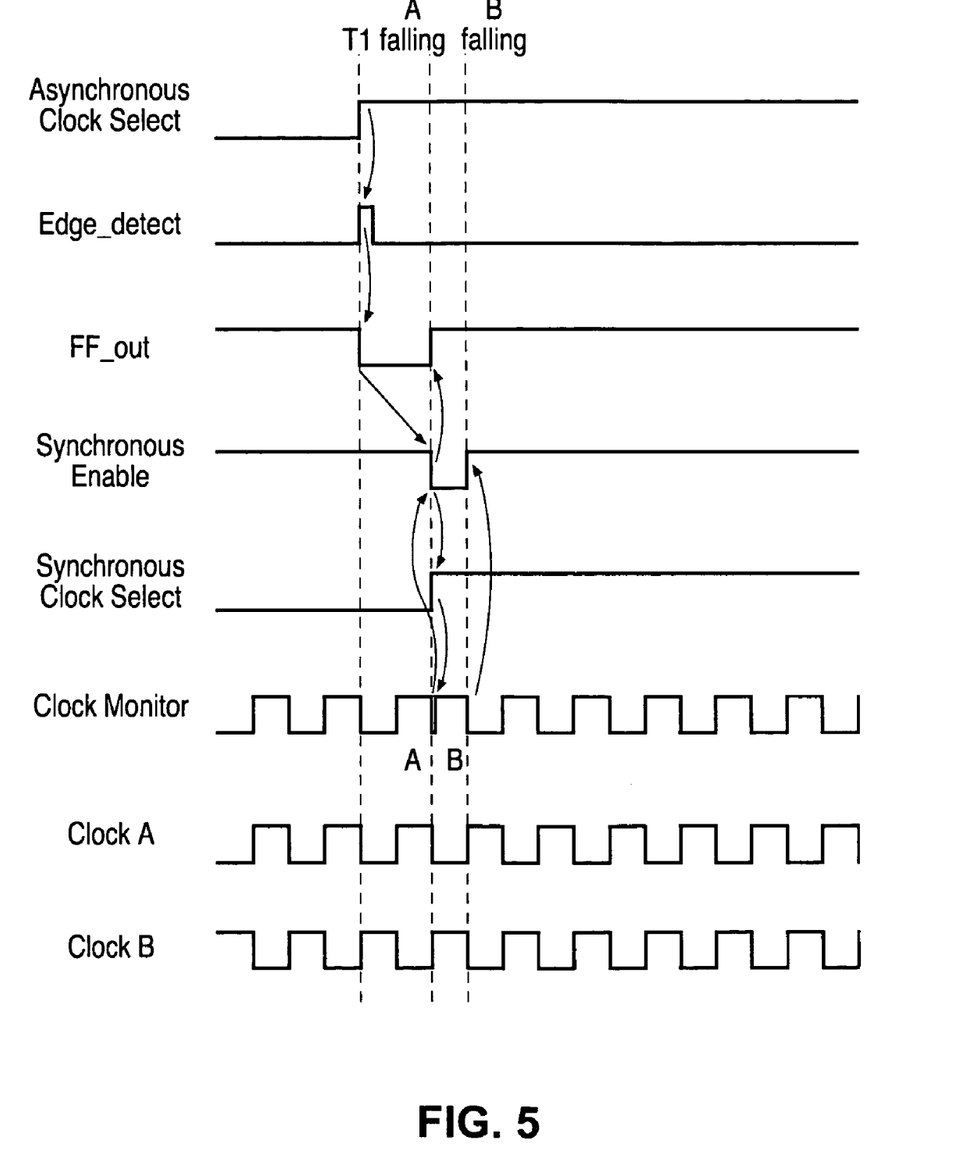
FIG. 5 includes signal waveforms illustrating the operation of the control circuit of FIG. 4 according to one embodiment of the present invention.

The operation of control circuit 208 will now be described in conjunction with the signal waveforms in FIG. 5. FIG. 5 includes signal waveforms illustrating the operation of the control circuit of FIG. 4 according to one embodiment of the present invention. Referring to FIG. 5, at the initial condition, the asynchronous clock select signal is at a logical low value and the first input signal (clock A) is selected. Thus, the clock monitor signal is passing clock pulses from clock A. The synchronous enable signal is at its normally high logical state to enable the enable buffer.

At time T1, a low-to-high transition occurs on the asynchronous clock select signal. Edge detector 220 detects the transition and generates a single pulse in response to the transition. The rising edge of the single edge_detect pulse triggers RS-FF 222 and the FF_out signal is "set" to a logical low state in response (note that FF_out is the inverted output signal from the flip-flop). The synchronous enable signal is at its normally high logical state, the reset input of RS-FF 222 is not active at this time.

Synchronizer 224 receives the high-to-low transition of the FF_out signal and synchronizes the transition to the next falling edge of the currently selected input signal (clock A). On the falling edge of clock A on the clock monitor signal, synchronizer 224 is triggered and generates a high-to-low transition on its output signal which is the synchronous enable signal. The enable signal is therefore deasserted and the enable buffer driven by the enable signal is accordingly disabled. When the enable buffer is disabled, the control circuit can operate to cause the internal multiplexer 104 to switch input signals.

Specifically, the high-to-low transition of the synchronous enable signal puts latch 226 in a transparent state and the latch passes the value of the asynchronous clock select signal to its output. Thus, the synchronous clock select signal transitions to a logical high when triggered by the falling edge of the enable signal. The transition of the synchronous clock select signal causes the internal multiplexer 104 to switch over to select the second input signal (clock B). Thus, in response to the transition on the synchronous clock select signal, the clock monitor signal begins to pass the clock pulses from clock B.

Then high-to-low transition of the synchronous enable signal is also fed back to the reset (R) terminal of RS-FF 222. Thus, on the falling edge of the synchronous enable signal, RS-FF 222 is "reset" and the FF_out signal transitions back to a logical high value.

Synchronizer 224 is continually triggered by the falling edges of the clock pulses on the clock monitor signal. On the next falling edge of the clock pulses on the clock monitor signal which is the selected clock signal clock B, synchronizer 224 is triggered and the data input value (FF_out) is passed to its output terminal. Because the FF_out signal has returned to a logical high value, the output of synchronizer 224 transitions to a logical high value when triggered by the falling edge of the clock pulse from clock B in the clock monitor signal. The synchronous enable signal is thus asserted and the enable buffer is once again enabled to pass the clock pulses on the clock monitor signal, comprising clock B, to the output signal of the multiplexer circuit.

When the synchronous enable signal returns to a logical high state, latch 226 is put in a non-transparent state and any transitions on the asynchronous clock select signal will not be passed through until the latch becomes transparent again, as triggered by the falling edge of the synchronous enable signal.

FIG. 5 illustrates the low-to-high transition on the asynchronous clock select signal and the resulting signal waveform for control circuit 208. Control circuit 208 works in a similar manner in response to a high-to-low transition on the asynchronous clock select signal to generate the corresponding synchronous enable signal and synchronous clock select signal to enable the switching of the input signals from the second input signal to the first input signal.

The above detailed descriptions are provided to illustrate specific embodiments of the present invention and are not intended to be limiting. Numerous modifications and variations within the scope of the present invention are possible. For example, the multiplexer circuit of the present invention can be readily extended to handle selection between three or more input signals. When the number of input signals is greater than two, the number of select signals increases. For instance, two input select signals are required to select between four input signals. The control circuit of the present invention can be adapted to operate on a set of two or more input select signals to provide the corresponding set of synchronous input select signals for the n-input internal multiplexer. The present invention is defined by the appended claims.

We claim:

1. A multiplexer circuit for selecting one of a first input signal and a second input signal as a first output signal based on a first input select signal, the multiplexer circuit comprising:

a multiplexer having a first input terminal for receiving the first input signal and a second input terminal for receiving the second input signal, the multiplexer having a select input terminal receiving a second input select signal, the multiplexer providing a second output signal being the first input signal when the second input select signal has a first logical state and the second input signal when the second input select signal has a second, opposite logical state;

a control circuit coupled to receive the second output signal and the first input select signal, the control circuit generating the second input select signal and an enable signal, wherein the transitions of the second input select signal and the transitions of the enable signal are synchronized to a first transition of the second output signal; and an enable buffer coupled to receive the second output signal and the enable signal, the enable buffer providing the second output signal as the first output signal when the enable signal is asserted and the enable buffer holding the first output signal at a first logical state when the enable signal is deasserted, wherein in response to a transition on the first input select signal, the enable signal is deasserted at a next first transition of the second output signal and in response to the enable signal being deasserted, the second input select signal transitions to the same logical state as the first input select signal, thereby causing the second output signal to switch from the currently selected input signal to the to-be-selected input signal, and the enable signal is asserted on a next first transition of the second output signal subsequent to the switching of second output signal to the to-be-selected input signal; and wherein the control circuit comprises:

an edge detector coupled to receive the first input select signal, the edge detector generating a pulse as output signal in response to a transition on the first input select signal;

a reset-set-flip-flop receiving the output signal from the edge detector as the set input signal, the enable signal as the reset input signal and providing an output signal having a first logical state when the set input signal is asserted and a second, opposite logical state when the reset input signal is asserted;

a synchronizer circuit coupled to receive the output signal of the reset-set-flip-flop as a data input signal and the second output signal as a clock input signal, the synchronizer circuit generating the enable signal, wherein the enable signal has a logical value corresponding to the data input signal and the transitions of the enable signal are synchronized to the first transition of the second output signal; and a latch coupled to receive the first input select signal as a data input signal and the enable signal as a clock input signal, the latch generating the second input select signal, wherein the second input select signal has a logical value corresponding to the first input select signal and the transitions of the second input select signal are synchronized to the first transition of the second output signal.

2. The multiplexer circuit of claim 1, wherein the enable buffer comprises an AND logic gate.

3. The multiplexer circuit of claim 2, wherein the enable signal has a logical high value when asserted and a logical low value when deasserted.

4. The multiplexer circuit of claim 1, wherein the first transition comprises a falling edge of the second output signal and the first logical state of the first output signal comprises a logical low state.

5. The multiplexer circuit of claim 1, wherein the first transition comprises a rising edge of the second output signal and the first logical state of the first output signal comprises a logical high state.

6. The multiplexer circuit of claim 1, wherein the first input signal and the second input signal comprise periodic signals having respective first frequency and second frequency.

7. The multiplexer circuit of claim 6, wherein the first input signal and the second input signal comprise asynchronous periodic signals where the first frequency is different from the second frequency.

8. The multiplexer circuit of claim 6, wherein the first input signal and the second input signal comprise synchronous periodic signals with any phase relation where the first frequency is the same as the second frequency.

9. The multiplexer circuit of claim 1, wherein the first input signal and the second input signal comprise asynchronous clock signals, or synchronous clock signals with any phase, relation and the first input select signal comprises an asynchronous clock select signal for selecting one of the clock signals.

10. A method for selecting one of a first input signal and a second input signal as a first output signal based on a first input select signal, the method comprising:
generating a second output signal being a selected one of the first and second input signals based on a second input select signal;
detecting a transition on the first input select signal;
in response to a transition being detected on the first input select signal, disabling the first output signal at a next first transition of the second output signal;
in response to the first output signal being disable, generating the second input select signal, the second input select signal having the same logical state as the first input select signal and having transitions synchronized to the next first transition of the second output signal;
in response to transitions on the second input select signal, switching the second output signal from the currently selected input signal to the to-be-selected input signal; and
subsequent to the switching of the second output signal, enabling the first output signal at a next first transition of the second output signal, wherein the second output signal is passed as the first output signal, wherein generating the second input select signal comprises:
receiving the first input select signal;
generating a pulse in response to a transition on the first input select signal;
providing the pulse as the set input signal of a reset-set-flip-flop, providing the enable signal as the reset input signal of the reset-set-flip-flop;
generating an output signal at the reset-set-flip-flop having a first logical state when the set input signal is asserted and a second, opposite logical state when the reset input signal is asserted;
providing the output signal of the reset-set-flip-flop as a data input signal of a synchronizer circuit, providing the second output signal as a clock input signal of the synchronizer circuit;
generating the enable signal having a logical value corresponding to the data input signal where the transitions of the enable signal are synchronized to the first transitions of the second output signal;
providing the first input select signal as a data input signal of a latch, and providing the enable signal as a clock input signal of the latch; and
generating the second input select signal having a logical value corresponding to the first input select signal where the transitions of the second input select signal are synchronized to the first transitions of the second output signal.

11. The method of claim 10, wherein disabling the first output signal comprises holding the first output signal at a first logical state.

12. The method of claim 11, wherein the first transition comprises a falling edge of the second output signal and the first logical state of the first output signal comprises a logical low state.

13. The method of claim 11, wherein the first transition comprises a rising edge of the second output signal and the first logical state of the first output signal comprises a logical high state.

14. The method of claim 10, wherein the first input signal and the second input signal comprise periodic signals having respective first frequency and second frequency.

15. The method of claim 14, wherein the first input signal and the second input signal comprise asynchronous periodic signals where the first frequency is different from the second frequency.

16. The method of claim 14, wherein the first input signal and the second input signal comprise synchronous periodic signals with any phase relation where the first frequency is the same as the second frequency.

17. The method of claim 10, wherein the first input signal and the second input signal comprise asynchronous clock signals, or synchronous clock signals with any phase relation, and the first input select signal comprises an asynchronous clock select signal for selecting one of the clock signals.

* * * * *